US012420128B2

(12) United States Patent
Monfils et al.

(10) Patent No.: US 12,420,128 B2
(45) Date of Patent: *Sep. 23, 2025

(54) FIRE-FIGHTING FOAM COMPOSITION

(71) Applicant: Tyco Fire Products LP, Cranston, RI (US)

(72) Inventors: JoAnna M. Monfils, Peshtigo, WI (US); John P. Libal, Peshtigo, WI (US); Blake H. Bomann, Greenville, WI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,120

(22) Filed: Feb. 29, 2024

(65) Prior Publication Data

US 2024/0198158 A1 Jun. 20, 2024

Related U.S. Application Data

(63) Continuation of application No. 18/307,691, filed on Apr. 26, 2023, now Pat. No. 11,938,363, which is a continuation of application No. 17/723,009, filed on Apr. 18, 2022, now Pat. No. 11,666,791, which is a continuation-in-part of application No. 17/694,653, filed on Mar. 14, 2022, now Pat. No. 11,865,393.

(60) Provisional application No. 63/297,384, filed on Jan. 7, 2022, provisional application No. 63/288,024, filed on Dec. 10, 2021, provisional application No. 63/288,020, filed on Dec. 10, 2021, provisional application No. 63/288,026, filed on Dec. 10, 2021, provisional application No. 63/245,028, filed on Sep. 16, 2021, provisional application No. 63/215,006, filed on Jun. 25, 2021, provisional application No. 63/188,633, filed on May 14, 2021.

(51) Int. Cl.
*A62D 1/02* (2006.01)
*A62C 99/00* (2010.01)
*A62D 1/00* (2006.01)

(52) U.S. Cl.
CPC ........ *A62D 1/0071* (2013.01); *A62C 99/0036* (2013.01); *A62D 1/0042* (2013.01)

(58) Field of Classification Search
None
See application file for complete search history.

(56) References Cited

U.S. PATENT DOCUMENTS

| | | | |
|---|---|---|---|
| 3,186,943 | A | 6/1965 | Barthauer |
| 3,479,285 | A | 11/1969 | Barthauer |
| 3,956,138 | A | 5/1976 | Crockett |
| 4,060,489 | A | 11/1977 | Chiesa, Jr. |
| 4,398,605 | A | 8/1983 | Conklin et al. |
| 4,410,508 | A | 10/1983 | Brown et al. |
| 5,218,021 | A | 6/1993 | Clark et al. |
| 5,225,095 | A | 7/1993 | Dimaio et al. |
| 5,296,164 | A | 3/1994 | Thach et al. |
| 5,391,721 | A | 2/1995 | Hanen et al. |
| 5,434,192 | A | 7/1995 | Thach et al. |
| 5,496,475 | A | 3/1996 | Jho et al. |
| 5,616,273 | A | 4/1997 | Clark et al. |
| 5,706,895 | A | 1/1998 | Sydansk |
| 5,882,541 | A | 3/1999 | Achtmann |
| 5,997,758 | A | 12/1999 | Barbarin et al. |
| 6,262,128 | B1 | 7/2001 | Stern et al. |
| 6,599,872 | B1 | 7/2003 | Hubert et al. |
| 7,005,082 | B2 | 2/2006 | Clark |
| 7,011,763 | B2 | 3/2006 | Clark |
| 7,135,125 | B2 | 11/2006 | Clark |
| 7,172,709 | B2 | 2/2007 | Clark |
| 7,199,083 | B2 | 4/2007 | Zevallos |
| 7,271,133 | B2 | 9/2007 | Weaver et al. |
| 7,334,640 | B2 | 2/2008 | Hanes et al. |
| 7,381,696 | B2 | 6/2008 | Hubert et al. |
| 7,541,316 | B2 | 6/2009 | Maresh |
| 7,569,155 | B2 | 8/2009 | Schaefer |
| 7,588,645 | B2 | 9/2009 | Griese et al. |
| 7,888,297 | B2 | 2/2011 | Hanes et al. |
| 7,888,308 | B2 | 2/2011 | Swazey |
| 7,994,111 | B2 | 8/2011 | Caggioni et al. |
| 8,043,999 | B2 | 10/2011 | Sullivan et al. |
| 8,076,270 | B2 | 12/2011 | Smith et al. |
| 8,207,094 | B2 | 6/2012 | Hutchins et al. |

(Continued)

FOREIGN PATENT DOCUMENTS

| | | | |
|---|---|---|---|
| CN | 1599633 | A | 3/2005 |
| CN | 101198381 | A | 6/2008 |
| CN | 105056458 | A | 11/2015 |
| CN | 108042967 | A | 5/2018 |
| CN | 112675469 | A | 4/2021 |
| CN | 112694638 | A | 4/2021 |
| DE | 20 2021 100 301 | U1 | 4/2021 |
| WO | WO-2008/058324 | A1 | 5/2008 |
| WO | WO-2011/019876 | A2 | 2/2011 |
| WO | WO-2011/050980 | A2 | 5/2011 |
| WO | WO-2013/061266 | A1 | 5/2013 |

OTHER PUBLICATIONS

Derwent-Acc-No. 2020-69248T as Abstract for WO 2020149733 A1 (Jul. 2020). (Year: 2020).*

(Continued)

*Primary Examiner* — Joseph D Anthony
(74) *Attorney, Agent, or Firm* — Foley & Lardner LLP

(57) ABSTRACT

A firefighting foam concentrate having a sugar component including a monosaccharide sugar, a sugar alcohol, or a mixture of any two or more thereof; a surfactant component comprising an anionic surfactant, a zwitterionic surfactant, or a mixture of any two or more thereof; and a suspension agent including microfibrillated cellulose and an oligosaccharide, a polysaccharide, or a mixture of any two or more thereof; wherein the composition is substantially free of fluorinated compounds.

9 Claims, No Drawings

(56) References Cited

U.S. PATENT DOCUMENTS

| | | | | |
|---|---|---|---|---|
| 8,298,436 | B2 | 10/2012 | Michael | |
| 8,366,955 | B2 | 2/2013 | Thomas et al. | |
| 8,413,721 | B2 | 4/2013 | Welton et al. | |
| 8,524,104 | B1 | 9/2013 | Michael | |
| 8,703,691 | B2 | 4/2014 | Caggioni et al. | |
| 8,772,359 | B2 | 7/2014 | Swazey | |
| 8,783,374 | B2 | 7/2014 | Rains et al. | |
| 9,045,716 | B2 | 6/2015 | Swazey et al. | |
| 9,259,602 | B2 | 2/2016 | Robinet et al. | |
| 9,289,636 | B2 | 3/2016 | Mathis | |
| 9,420,784 | B2 | 8/2016 | Vanlaer et al. | |
| 9,487,661 | B2 | 11/2016 | Johnson et al. | |
| 9,662,522 | B2 | 5/2017 | Liu et al. | |
| 9,669,246 | B2 | 6/2017 | Bowen et al. | |
| 9,675,828 | B1 | 6/2017 | Sery | |
| 9,687,686 | B2 | 6/2017 | Blunk et al. | |
| 9,776,029 | B2 | 10/2017 | Izumida et al. | |
| 9,956,447 | B2 | 5/2018 | Martin et al. | |
| 9,956,448 | B2 | 5/2018 | Martin | |
| 10,030,214 | B2 | 7/2018 | Swazey et al. | |
| 10,071,273 | B2 | 9/2018 | Hansen et al. | |
| 10,159,863 | B2 | 12/2018 | Mariampillai et al. | |
| 10,173,089 | B2 | 1/2019 | Xie | |
| 10,214,708 | B2 | 2/2019 | Swazey et al. | |
| 10,328,297 | B2 | 6/2019 | Bowen et al. | |
| 10,335,624 | B2 | 7/2019 | Libal | |
| 10,369,394 | B2 | 8/2019 | Bowen | |
| 10,369,395 | B2 | 8/2019 | Bowen et al. | |
| 10,443,019 | B2 | 10/2019 | Fossum et al. | |
| 10,457,900 | B2 | 10/2019 | Fossum et al. | |
| 10,494,592 | B2 | 12/2019 | Applegate et al. | |
| 10,518,120 | B2 | 12/2019 | Pai et al. | |
| 10,625,108 | B2 | 4/2020 | Mariampillai et al. | |
| 10,653,910 | B2 | 5/2020 | Da Costa et al. | |
| 10,780,305 | B2 | 9/2020 | Xie et al. | |
| 10,870,030 | B2 | 12/2020 | Libal | |
| 10,940,352 | B2 | 3/2021 | Worsman | |
| 11,065,490 | B2 | 7/2021 | Lavergne et al. | |
| 11,173,334 | B2 | 11/2021 | Xie et al. | |
| 11,497,952 | B1 | 11/2022 | Monfils et al. | |
| 11,666,791 | B2 * | 6/2023 | Monfils | A62D 1/0042 252/3 |
| 11,673,010 | B2 * | 6/2023 | Monfils | A62D 1/0042 169/47 |
| 11,673,011 | B2 * | 6/2023 | Monfils | A62D 1/0042 252/3 |
| 11,771,939 | B2 * | 10/2023 | Monfils | A62D 1/0042 252/3 |
| 11,865,393 | B2 * | 1/2024 | Monfils | A62D 1/0042 |
| 11,890,496 | B2 * | 2/2024 | Monfils | A62D 1/0042 |
| 11,911,644 | B2 * | 2/2024 | Monfils | A62D 1/0042 |
| 11,938,362 | B2 * | 3/2024 | Monfils | A62C 99/0036 |
| 11,938,363 | B2 * | 3/2024 | Monfils | A62C 99/0036 |
| 11,951,345 | B2 * | 4/2024 | Monfils | A62D 1/0042 |
| 2002/0014610 | A1 * | 2/2002 | Tanaka | A62D 1/0071 252/3 |
| 2003/0201419 | A1 * | 10/2003 | Tanaka | A62D 1/0057 252/3 |
| 2004/0006175 | A1 | 1/2004 | Diener et al. | |
| 2005/0113272 | A1 | 5/2005 | Yeung et al. | |
| 2007/0256836 | A1 | 11/2007 | Welton et al. | |
| 2008/0108541 | A1 * | 5/2008 | Swazey | C11D 17/0004 510/535 |
| 2008/0196908 | A1 | 8/2008 | Schaefer | |
| 2011/0097294 | A1 | 4/2011 | Anthony et al. | |
| 2013/0313465 | A1 | 11/2013 | Podella et al. | |
| 2014/0138104 | A1 | 5/2014 | Robinet et al. | |
| 2016/0023032 | A1 | 1/2016 | Bowen | |
| 2016/0107015 | A1 | 4/2016 | Cheng | |
| 2017/0056698 | A1 * | 3/2017 | Pai | A62D 1/0042 |
| 2017/0259099 | A1 | 9/2017 | Blunk et al. | |
| 2017/0306562 | A1 | 10/2017 | Phipps et al. | |
| 2018/0325141 | A1 * | 11/2018 | Nakajima | A21D 13/50 |
| 2018/0361185 | A1 | 12/2018 | Siem | |
| 2019/0008187 | A1 | 1/2019 | Konda et al. | |
| 2019/0262647 | A1 * | 8/2019 | Havelka-Rivard | A62D 1/0071 |
| 2019/0314660 | A1 | 10/2019 | Chirac et al. | |
| 2020/0094093 | A1 | 3/2020 | Worsman et al. | |
| 2020/0101340 | A1 | 4/2020 | Worsman | |
| 2020/0139180 | A1 | 5/2020 | Lovas | |
| 2020/0206552 | A1 | 7/2020 | Mariampillai et al. | |
| 2020/0215372 | A1 | 7/2020 | Lavergne et al. | |
| 2020/0368570 | A1 | 11/2020 | Hodgen et al. | |
| 2021/0009787 | A1 | 1/2021 | Hulbert et al. | |
| 2021/0046347 | A1 * | 2/2021 | LaVergne | A62D 1/0085 |
| 2021/0128431 | A1 | 5/2021 | Sartingen et al. | |
| 2021/0146182 | A1 | 5/2021 | Hugener | |
| 2021/0154512 | A1 | 5/2021 | Libal | |
| 2021/0187337 | A1 | 6/2021 | Worsman | |
| 2021/0283449 | A1 | 9/2021 | Lavergne et al. | |
| 2022/0040512 | A1 | 2/2022 | Saari | |
| 2022/0134158 | A1 | 5/2022 | Havelka-Rivard et al. | |
| 2022/0362601 | A1 | 11/2022 | Monfils et al. | |
| 2022/0362602 | A1 | 11/2022 | Monfils et al. | |
| 2022/0362603 | A1 | 11/2022 | Monfils et al. | |
| 2022/0362604 | A1 | 11/2022 | Monfils et al. | |
| 2022/0411644 | A1 | 12/2022 | Rhoades et al. | |
| 2023/0051502 | A1 | 2/2023 | Monfils et al. | |
| 2023/0256280 | A1 | 8/2023 | Monfils et al. | |
| 2023/0256281 | A1 * | 8/2023 | Monfils | A62D 1/0042 252/3 |
| 2023/0372757 | A1 | 11/2023 | Monfils et al. | |
| 2023/0405382 | A1 | 12/2023 | Monfils et al. | |
| 2024/0189642 | A1 * | 6/2024 | Monfils | A62D 1/0042 |

FOREIGN PATENT DOCUMENTS

| | | | | |
|---|---|---|---|---|
| WO | WO-2016/075480 | A1 | 5/2016 | |
| WO | WO-2016/082041 | A1 | 6/2016 | |
| WO | WO-2018/022763 | A1 | 2/2018 | |
| WO | WO-2018/134393 | A1 | 7/2018 | |
| WO | WO-2018/234647 | A1 | 12/2018 | |
| WO | WO-2019/202045 | A1 | 10/2019 | |
| WO | WO-2020/033255 | A1 | 2/2020 | |
| WO | WO-2020/084277 | A1 | 4/2020 | |
| WO | WO-2020/109654 | A1 | 6/2020 | |
| WO | WO-2020/144579 | A1 | 7/2020 | |
| WO | WO 2020149733 | A1 * | 7/2020 | C09K 8/594 |
| WO | WO-2020/217126 | A1 | 10/2020 | |
| WO | WO-2020/247780 | A1 | 12/2020 | |
| WO | WO-2021/099308 | A1 | 5/2021 | |
| WO | WO-2022/094399 | | 5/2022 | |
| WO | WO-2022/238783 | A1 | 11/2022 | |
| WO | WO-2022/238784 | A1 | 11/2022 | |
| WO | WO-2022/238785 | A1 | 11/2022 | |
| WO | WO-2022/238786 | A1 | 11/2022 | |
| WO | WO-2022/238787 | A1 | 11/2022 | |
| WO | WO-2022/240478 | A1 | 11/2022 | |
| WO | WO-2022/240479 | A1 | 11/2022 | |
| WO | WO-2022/240480 | A1 | 11/2022 | |
| WO | WO-2022/240481 | A1 | 11/2022 | |

OTHER PUBLICATIONS

CN 112694638 A (English Language Abstract). (Year: 2021).*

Derwent Acc. No. 2020-69248T; Chai, et al; "Composition with Foaming Properties"; Derwent; Abstract for WO2020/149733A1; dated Jul. 23, 2020; 4 pages.

International Search Report and Written Opinion on PCT Appl. Ser. No. PCT/IB2022/053615 dated Jul. 26, 2022 (13 pages).

International Search Report and Written Opinion on PCT Appl. Ser. No. PCT/IB2022/053618 dated Jul. 22, 2022 (13 pages).

International Search Report and Written Opinion on PCT Appl. Ser. No. PCT/IB2022/053619 dated Jul. 29, 2022 (14 pages).

International Search Report and Written Opinion on PCT Appl. Ser. No. PCT/IB2022/053620 dated Jul. 29, 2022 (14 pages).

International Search Report and Written Opinion on PCT Appl. Ser. No. PCT/IB2022/053621 dated Jul. 29, 2022 (15 pages).

* cited by examiner

FIRE-FIGHTING FOAM COMPOSITION

CROSS-REFERENCE TO RELATED APPLICATIONS

This application is a continuation of U.S. patent application Ser. No. 18/307,691, filed on Apr. 26, 2023, which is a continuation of U.S. patent application Ser. No. 17/723,009, filed on Apr. 18, 2022, which is a continuation-in-part of U.S. patent application Ser. No. 17/694,653, filed on Mar. 14, 2022, which claims the benefit of priority to U.S. Provisional Patent Application Nos. 63/188,633, filed on May 14, 2021; 63/215,006, filed on Jun. 25, 2021; 63/245,028, filed Sep. 16, 2021; 63/288,024, filed on Dec. 10, 2021; 63/288,020, filed on Dec. 10, 2021; and 63/288,026, filed on Dec. 10, 2021. U.S. patent application Ser. No. 17/723,009 claims the benefit of priority to U.S. Provisional Patent Application No. 63/297,384, filed on Jan. 7, 2022. The contents of all of the above applications are incorporated herein by reference in their entirety.

BACKGROUND

Firefighting foams are often able to fight Class A and Class B fires. Class A fires are those involving combustible material such as paper, wood, etc. and can be fought by quenching and cooling with large quantities of water or solutions containing water. Class B fires are those involving flammable liquid fuels, gasoline, and other hydrocarbons and are difficult to extinguish. Most flammable liquids exhibit high vapor pressure along with low fire and flash points. This typically results in a wide flammability range. In this type of fire, the use of water as the sole firefighting agent is generally ineffective because the only means of fighting fire with water is through cooling.

Conventional foam-forming firefighting compositions commonly include fluorinated surfactants. There is a strong desire in the marketplace to replace these fluorinated fire-fighting products with non-fluorinated products. There is therefore a continuing need to produce non-fluorinated fire-fighting compositions, also known as synthetic fluorine-free foams or SFFF that can be deployed to fight Class A and Class B fires.

SUMMARY

The present application is directed to aqueous fire-fighting foam compositions, typically in concentrated form, which can be diluted with an aqueous diluent to provide a foam precursor composition. The more dilute foam precursor composition may be aerated to form a firefighting foam. The aqueous fire-fighting composition includes a sugar component, an anionic surfactant, a zwitterionic surfactant, an organic solvent, and a polysaccharide thickener. The application also provides a method of fighting a fire with the firefighting foam.

The present aqueous firefighting compositions include a sugar component substantially in the form of a monosaccharide sugar and/or a sugar alcohol; together with a surfactant component containing anionic surfactant and/or zwitterionic surfactant. The surfactant component is substantially free of and, often, does not contain any amine oxide or nonionic surfactant. The aqueous firefighting compositions may also include an organic solvent, e.g., a water-miscible organic solvent such as an alkylene glycol, glycerol, a water-soluble polyethylene glycol and/or a glycol ether. The composition may be substantially free of any fluorinated compound.

In one aspect, an aqueous firefighting foam composition is provided that includes a sugar component, which includes a monosaccharide sugar and/or sugar alcohol; a surfactant mixture containing a zwitterionic surfactant and an alkyl sulfate anionic surfactant, alkyl sulfonate anionic surfactant, an alkyl ether sulfate anionic surfactant, or a mixture of any two or more thereof; an organic solvent, such as a glycol, glycerol and/or glycol ether; and a polysaccharide thickener. An aqueous firefighting foam precursor may be formed by diluting the concentrated composition with a much larger volume of an aqueous diluent, e.g., municipal water and/or salt water. The resulting firefighting foam precursor may be aerated to provide a firefighting foam.

In another aspect, the aqueous firefighting foam composition includes a) a sugar component, which includes a monosaccharide sugar and/or sugar alcohol; b) an anionic surfactant, such as an alkyl sulfate, an alkyl sulfonate and/or an alkyl ether sulfate; c) a zwitterionic surfactant, such as an alkylamidopropyl hydroxysultaine surfactant, an alkylamidoalkyl betaine surfactant, an alkyl sulfobetaine surfactant, and/or an alkyl betaine surfactant, d) an organic solvent, which includes a glycol, glycerol, a glycol ether, a water-soluble polyethylene glycol, or a mixture of any two or more thereof, e) a polysaccharide thickener, such as xanthan and/or diutan gum; and f) at least about 40 wt. % water. The composition generally contains no more than 0.01 wt. % of the fluorinated surfactant, and may be completely free of any fluorinated surfactant or other fluorinated compound.

Another aspect provides an aqueous firefighting foam composition including a) at least about 10 wt. % of a sugar component, which comprises at least about 50 wt. %, or at least about 75 wt. % monosaccharide sugar, e.g., glucose and/or fructose; b) polysaccharide thickener; c) a surfactant component, which comprises anionic surfactant and zwitterionic surfactant; d) organic solvent comprising one or more of a glycol, glycol ether, glycerol and/or water-soluble polyethylene glycol (PEG); and e) at least about 40 wt. % water. Such a composition does not contain any amine oxide or nonionic surfactants and is substantially free of fluorinated compounds.

Another aspect provides an aqueous firefighting foam composition including a) a sugar component, which includes a monosaccharide sugar and/or sugar alcohol; b) an octyl sulfate salt and/or decyl sulfate salt and/or lauryl sulfate salt, c) an alkyl hydroxysultaine surfactant and/or alkylamidoalkyl hydroxysultaine surfactant, d) a polysaccharide thickener comprising a natural gum, such as xanthan gum, diutan gum or a derivative thereof, e) a solvent mixture including ethylene glycol, butyl carbitol and, optionally, glycerine; f) at least about 40 wt. % water. The composition generally contains no more than 0.01 wt. % fluorinated surfactant and, often, is completely free of any fluorinated surfactant or other fluorinated compound. Such a composition may not contain any amine oxide or nonionic surfactants.

Another aspect provides an aqueous firefighting foam composition including a) a sugar component, which comprises monosaccharide sugar (e.g., glucose and/or fructose) and/or sugar alcohol (e.g., sorbitol, mannitol and/or xylitol); b) a polysaccharide thickener, such as diutan gum and/or xanthan gum; c) a $C_8$-$C_{14}$ alkyl sulfate anionic surfactant; d) $C_8$-$C_{14}$ alkylamidopropyl hydroxysultaine surfactant; c) a solvent mixture including ethylene glycol and butyl carbitol; and f) at least about 40 wt. % water. The composition generally contains no more than 0.1 wt. % fluorinated surfactant and, often, is completely free of any fluorinated surfactant or other fluorinated compound. Such a composition typically does not contain any amine oxide or nonionic surfactants.

Another aspect provides an aqueous firefighting foam composition including a) a sugar component including one or more monosaccharide sugars and/or sugar alcohols, b) anionic surfactant, c) zwitterionic surfactant, d) a polysaccharide thickener, e) organic solvent that includes glycol ether having at least 8 carbon atoms and/or an alkylene glycol having at least 5 carbon atoms, f) at least about 30 wt. %, more often at least about 50 wt. % water. Such compositions may include about 5 to 40 wt. % and more typically about 10 to 20 wt. % of the sugar component. The sugar component may contain at least about 75 wt. %, or at least about 85 wt. % monosaccharide sugars. In some instances, the aqueous firefighting foam composition does not include any butyl carbitol. In some instances, the organic solvent includes 1,6-hexanediol, hexylene glycol, 1,12-dodecanediol, ethyleneglycol monophenyl ether, butyl carbitol, dipropylene glycol monobutyl ether, or a mixture of any two or more thereof. Such a composition typically does not contain any amine oxide or nonionic surfactants.

Another aspect provides an fluorine-free aqueous firefighting foam concentrate including a) a sugar component including one or more monosaccharide sugars and/or sugar alcohols, b) a surfactant system including at least one anionic surfactant and a zwitterionic surfactant, c) a polysaccharide thickener, d) organic solvent system including at least one organic solvent selected from a glycol ether, a glycol and a polyol, e) at least about 30 wt. %, more often at least about 40 wt. %, or at least about 50 wt. % water. Such concentrates may include about 10 to 25 wt. % and more typically about 10 to 20 wt. % of the sugar component. The sugar component may include at least about 75 wt. % monosaccharide sugar, e.g., glucose and/or fructose. In some instances, the fluorine-free aqueous firefighting foam concentrate also includes at least one of a divalent metal salt, a preservative, and an antimicrobial agent. Such a concentrate typically does not contain any amine oxide or nonionic surfactants.

Another aspect provides a fluorine-free aqueous firefighting composition that includes about 15 to 20 wt. % of a sugar component, which contains at least about 85 wt. % monosaccharide sugar; about 5 to 10 wt. % $C_8$-$C_{14}$ alkyl sulfate anionic surfactant; about 2 to 7 wt. % cocamidopropyl hydroxysultaine; about 5 to 10 wt. % of a water-miscible solvent mixture comprising butyl carbitol, ethylene glycol and glycerine (e.g., such that the composition contains about 4 to 6 wt. % butyl carbitol, about 1 to 3 wt. % ethylene glycol and about 0.1 to 1 wt. % glycerine); triethanolamine; about 0.5 to 3 wt. % polysaccharide thickener comprising xanthan gum and diutan gum; magnesium salt; and at least about 50 wt. % water. The sugar component may include at least about 85 wt. % of a mixture of glucose and fructose. The $C_8$-$C_{14}$ alkyl sulfate anionic surfactant may include a mixture of an octyl sulfate salt, a decyl sulfate salt and a lauryl sulfate salt. Such a composition does not contain any amine oxide or nonionic surfactant and is substantially free of fluorinated compounds.

In a further aspect, an aqueous firefighting composition may include a sugar component substantially in the form of a monosaccharide sugar and/or a sugar alcohol; together with a surfactant component containing anionic surfactant and/or zwitterionic surfactant; and a microfibrous cellulose. In such cases, the inclusion of a microfibrous cellulose suspension agent may aid in stabilizing the resulting dispersion. The concentrates may be substantially free of any fluorinated compound(s), e.g., contain no more than 0.01 wt. % fluorinated surfactant(s)/fluorinated compound(s) and may be completely free of any fluorinated surfactant or other fluorinated compound. In some embodiments, the concentrates and/or compositions are free of nonionic surfactants.

In a further aspect, a method of fighting a fire includes aerating a firefighting foam composition to form an areated firefighting foam; and administering the aerated firefighting foam to a fire or applying the aerated firefighting foam to a surface of a volatile flammable liquid. The firefighting foams for use in the method include any firefighting foam compositions or concentrates as described herein.

DETAILED DESCRIPTION

As used herein, “about” will be understood by persons of ordinary skill in the art and will vary to some extent depending upon the context in which it is used. If there are uses of the term which are not clear to persons of ordinary skill in the art, given the context in which it is used, “about” will mean up to plus or minus 10% of the particular term.

The use of the terms “a” and “and” and “the” and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or illustrative language (e.g., “such as”) provided herein, is intended merely to better illuminate the embodiments and does not pose a limitation on the scope of the claims unless otherwise stated. No language in the specification should be construed as indicating any non-claimed element as essential.

In one aspect, the aqueous firefighting foam compositions of the present disclosure include a sugar component, which includes a monosaccharide sugar and/or sugar alcohol; polysaccharide thickener; a surfactant component, which comprises anionic surfactant and/or zwitterionic surfactant; and water-miscible organic solvent. Such compositions generally are substantially free of fluorinated compounds, e.g., contain no more than 0.1 wt. % fluorinated surfactant and, often, are completely free of any fluorinated surfactant or other fluorinated compound. Such a composition typically does not contain any amine oxide or nonionic surfactants.

Sugars and/or sugar alcohols suitable for use in the present aqueous fire-fighting foam compositions are generally simple monosaccharide sugars or related sugar alcohols, but may include small amounts of other carbohydrates, such as common sugar (sucrose/dextrose) derived from sugar cane or sugar beets. Sucrose is a disaccharide composed from the basic, simple sugar molecules glucose and fructose. Mixtures where the majority of the sucrose has been broken down into its monosaccharide components, glucose and fructose (e.g., invert sugar), are quite suitable for use in the present compositions. The sugar component may contain at least about 75 wt. %, or at least 85 wt. % monosaccharide sugars and/or sugar alcohols. Often, the sugar component suitably contains at least about 75 wt. %, or at least about 85 wt. % monosaccharide sugars, such as glucose and/or fructose. The sugar component typically contains a total of no more than about 10 wt. % and, often no more than about 5 wt. % disaccharide sugars and oligosaccharides (as a percentage of the total weight of the sugar component).

Sucrose is readily available in view of its world production from sugar cane and sugar beets on the order of millions of tons per annum. Those skilled in the art will also understand that other commercially available simple monosaccharides and related sugar alcohols can be utilized in the present foam compositions. Examples of suitable monosaccharides for use in the present foam compositions include one or more of glucose, fructose, mannose, xylose and galactose. Examples of suitable sugar alcohols for use in the present foam compositions include one or more of a four carbon sugar alcohol, such as erythritol, a five carbon alditol, such as xylitol, a six carbon alditol, such as mannitol and/or sorbitol, and other sugar alcohols, such as isomalt. The sugar alcohol may be one derived from a monosaccharide.

The present aqueous fire-fighting foam compositions generally include a sugar component including at least about 50 wt. %, at least about 75 wt. % and, in many instances at least about 85 wt. % of one or more monosaccharide sugars and/or sugar alcohols. Suitable examples include such a sugar component containing one or more of glucose, fructose, mannose, xylose, sorbitol, xylitoln and mannitol. The foam composition may include about 5 to 25 wt. %, or about 5 to 20 wt. % of the sugar component. In some instances, the foam composition may include about 10 wt. % to 15 wt. % of the sugar component. In some embodiments, the sugar component comprises at least about 75 wt. %, at least about 80 wt. %, or even at least about 90 wt. % monosaccharide sugar and/or sugar alcohol. For example, the sugar component may comprise at least about 75 wt. %, at least about 80 wt. %, at least about 85 wt. %, or even at least about 90 wt. % of one or more of glucose, fructose, mannose, xylitol, sorbitol, and mannitol. In some embodiments, the foam composition may include a sugar component, which comprises at least about 75 wt. % of one or more sugar alcohols, such as xylitol, sorbitol and mannitol. The sugar component may include at least about 75 wt. %, at least about 80 wt. %, at least about 85 wt. %, or even at least about 90 wt. % of one or more of glucose, fructose, and sorbitol. For example, the sugar component may include at least about 75 wt. %, or at least about 85 wt. % glucose and/or fructose.

The present aqueous fire-fighting foam compositions typically include an anionic surfactant. The anionic surfactant may suitably include an aliphatic sulfate surfactant, an aliphatic sulfonate surfactant, aliphatic ether sulfate surfactant and/or an aliphatic ether sulfonate surfactant. The anionic surfactant may suitably include an alkyl sulfate surfactant, an alkyl sulfonate surfactant, alkyl ether sulfate surfactant and/or an alkyl ether sulfonate surfactant. The anionic surfactant typically includes an alkyl sulfate surfactant and/or an alkyl sulfonate surfactant. The alkyl sulfate salt surfactant typically includes include a $C_{8-12}$-alkyl sulfate salt. Suitable examples of the $C_{8-12}$-alkyl sulfate salt include a dodecyl sulfate salt (lauryl sulfate salt), a decyl sulfate salt, an octyl sulfate salt, or a combination of any two or more thereof. In some embodiments, the alkyl sulfate salt includes an alkyl sulfate sodium salt, such as a sodium decyl sulfate, sodium octyl sulfate, or a combination thereof. In some embodiments, the alkyl sulfate salt includes an alkyl sulfate ammonium salt, such as an ammonium decyl sulfate, ammonium octyl sulfate, ammonium lauryl sulfate, triethanolamine lauryl sulfate salt or a combination thereof. In embodiments that include the anionic surfactant, the aqueous firefighting foam composition may include about 1 to 25 wt. % or about 2 to 20 wt. % of the anionic surfactant. Typically, the aqueous firefighting foam composition may include about 3 to 15 wt. %, about 5 to 12 wt. % and, in some instances, about 5 to 10 wt. % of a the anionic surfactant.

In some embodiments, the aqueous fire-fighting foam composition may include an anionic surfactant comprises a $C_{8-14}$-alkyl sulfate salt and/or a $C_{8-14}$-alkyl sulfonate salt. In some embodiments, the aqueous fire-fighting foam composition may include an anionic surfactant, which comprises one or more surfactants selected from $C_{8-12}$-alkyl sulfate salts and/or a $C_{8-12}$-alkyl sulfonate salts. For example, one or more of octyl sulfate salts, decyl sulfate salts, dodecyl sulfate salts and tetradecyl sulfate salts may be suitable for use as anionic surfactants in the present foam composition. The anionic surfactant may suitably be a sodium, potassium, and/or ammonium salt (e.g., an $NH_{4+}$ or trialkyl ammonium salt).

In some embodiments, the aqueous fire-fighting foam composition may include an anionic surfactant comprising a $C_{8-14}$-alkyl sulfate amine salt. In some embodiments, the aqueous fire-fighting foam composition may include an anionic surfactant, which comprises one or more surfactants selected from $C_{8-12}$-alkyl sulfate amine salts and/or a $C_{8-12}$-alkyl sulfonate amine salts. For example, one or more of triethanolamine octyl sulfate salts, triethanolamine decyl sulfate salts, triethanolamine dodecyl sulfate salts and triethanolamine tetradecyl sulfate salts may be suitable for use as anionic surfactants in the present fire-fighting foam composition.

The present aqueous fire-fighting foam compositions typically include a zwitterionic surfactant. The zwitterionic surfactant typically includes one or more of an aliphatic amidoalkyl betaine surfactant, an aliphatic betaine surfactant, an aliphatic sulfobetaine surfactant and an aliphatic amidoalkylene hydroxysultaine surfactant, such as an aliphatic amidopropyl hydroxysultaine surfactant. The zwitterionic surfactant may include one or more of an alkylamidoalkyl betaine surfactant, an alkyl betaine surfactant, an alkyl sulfobetaine surfactant and an alkylamidoalkylene hydroxysultaine surfactant, such as an alkylamidopropyl hydroxysultaine surfactant. For example, the foam composition may include a zwitterionic surfactant, which comprises one or more of a $C_{8-18}$-alkylamidopropyl hydroxysultaine surfactant, a $C_{8-18}$-alkylamidopropyl betaine surfactant a $C_{8-18}$-alkyl sulfobetaine surfactant and a $C_{8-18}$-alkyl betaine surfactant. Suitable examples of the alkylamidoalkylene hydroxysultaine surfactant include a $C_{8-18}$-alkylamidopropyl hydroxysultaine surfactant, such as a cocamidopropyl hydroxysultaine surfactant, which includes a laurylamidopropyl hydroxysultaine and a myristylamidopropyl hydroxysultaine. Suitable examples of the alkylamidoalkyl betaine surfactant include a $C_{8-18}$-alkylamidoalkyl betaine surfactant, such as a cocamidopropyl betaine, a tallowamidopropyl betaine, a laurylamidopropyl betaine or a myristylamidopropyl betaine. In some embodiments, the zwitterionic surfactant includes a $C_{8-14}$-alkylamidopropyl hydroxysultaine, such as a cocamidopropyl hydroxysultaine. In some embodiments, the zwitterionic surfactant includes laurylamidopropyl hydroxysultaine and/or myristylamidopropyl hydroxysultaine. In embodiments that include the zwitterionic surfactant, the aqueous firefighting foam composition may include about 1 to 15 wt. % and often about 1 to 12 wt. % of the zwitterionic surfactant. In certain embodiments, the aqueous firefighting foam composition may include about 1 to 10 wt. %, or about 2 to 7 wt. % of the zwitterionic surfactant.

The present aqueous fire-fighting foam compositions do not include nonionic surfactants or are substantially free of nonionic surfactant. Substantially free in this context means that the aqueous fire-fighting foam compositions include no more than 0.1 wt. % nonionic surfactant. In some instances, the aqueous fire-fighting foam compositions include no more than 0.01 wt. % nonionic surfactant.

The present aqueous fire-fighting foam compositions typically include a water-miscible solvent, which may suitably include one or more of a glycol, a glycol ether, glycerol, and a water-soluble polyethylene glycol. Examples of suitable organic solvents include diethylene glycol n-butyl ether, dipropylene glycol n-propyl ether, hexylene glycol, ethylene glycol, propylene glycol, diethylene glycol, dipropylene glycol, tripropylene glycol, dipropylene glycol monobutyl ether, dipropylene glycol monomethyl ether, diethylene glycol monobutyl ether ("butyl carbitol"), ethylene glycol monobutyl ether, tripropylene glycol monomethyl ether, dipropylene glycol monoethyl ether, glycerol, and mixtures of two or more thereof. The organic solvent may include a mixture of glycerol (glycerine), an alkylene glycol, and a glycol ether, such as a glycol butyl ether. In some embodiments, the organic solvent includes an alkylene glycol ether, such as ethylene glycol monoalkyl ether, propylene glycol monoalkyl ether, dipropylene glycol monoalkyl ether (e.g., diethylene glycol monoalkyl ether (e.g., butyl carbitol). In some embodiments, the organic solvent includes an alkylene glycol, such as ethylene glycol, propylene glycol, dipropylene glycol and/or diethylene glycol. In some embodiments, the organic solvent includes a polyol, such as glycerine. The organic solvent may include a mixture of butyl carbitol, a glycol ether, such as ethylene glycol and/or propylene glycol, and glycerine. For example, the organic solvent can include glycerine, ethylene glycol, and butyl carbitol. In another suitable example, the organic solvent includes glycerine, propylene glycol, and butyl carbitol.

In some instances, the organic solvent in the present compositions may include one or more glycol ethers having at least 8 carbon atoms and/or alkylene glycols having at least 5 carbon atoms (e.g., having about 5 to 12 carbon atoms). Examples of such alkylene glycols include 1,5-pentanediol, 1,6-hexanediol, hexylene glycol, 1,7-heptanediol, 1,8-octanediol, 1,9-nonanediol, 1,10-decanediol and 1,12-dodecanediol. Examples of suitable glycol ethers include ethyleneglycol monophenyl ether, diethyleneglycol monobutyl ether ("butyl carbitol"), ethyleneglycol monohexyl ether, dipropyleneglycol monopropyl ether and dipropylene glycol monobutyl ether. For example, the organic solvent may include one or more of 1,6-hexanediol, hexylene glycol, ethyleneglycol monophenyl ether, butyl carbitol, 1,12-dodecanediol and dipropylene glycol monobutyl ether. For example, the organic solvent may include a combination of 1,6-hexanediol and dipropylene glycol monobutyl ether. In another suitable example, the organic solvent may include a combination of 1,6-hexanediol, ethyleneglycol, butyl carbitol and dipropylene glycol monobutyl ether. In another suitable example, the organic solvent may include a combination of 1,6-hexanediol, dipropylene glycol monobutyl ether and ethyleneglycol monophenyl ether. In another suitable example, the organic solvent may include a combination of 1,6-hexanediol, 1,12-dodecanediol, ethyleneglycol monophenyl ether and dipropylene glycol monobutyl ether. In another suitable example, the organic solvent may include a combination of 1,12-dodecanediol, ethyleneglycol monophenyl ether and dipropylene glycol monobutyl ether. In another suitable example, the organic solvent may include a combination of 1,6-hexanediol, 1,12-dodecanediol and ethyleneglycol monophenyl ether.

The foam composition may suitably include about 1 to 50 wt. %, about 1 to 25 wt. %, about 1 to 20 wt. %, about 2 to 15 wt. %, or about 5 to 10 wt. % organic solvent. In many embodiments, the aqueous firefighting foam composition includes an organic solvent including one or more of an alkylene glycol, glycerine, and a glycol ether. The alkylene glycol may include 1,6-hexanediol, 1,12-dodecanediol, propylene glycol and/or ethylene glycol. The glycol ether typically includes ethylene glycol monoalkyl ether, diethylene glycol monoalkyl ether, dipropylene glycol monoalkyl ether, triethylene glycol monoalkyl ether, ethyleneglycol monophenyl ether and 1-butoxyethoxy-2-propanol. In some embodiments, the organic solvent may be a mixture of glycerine, alkylene glycol and glycol ether. In some embodiments, the organic solvent may be a mixture of glycerine, propylene glycol and alkyl carbitol. In some embodiments, the organic solvent may be a mixture of glycerine, ethylene glycol and alkyl carbitol. In such embodiments, the organic solvent may include the alkylene glycol and alkyl carbitol in a weight ratio of about 0.1:1 to 10:1 or about 0.2:1 to 5:1. In some embodiments, the organic solvent may be a mixture of glycerine, ethylene glycol, and butyl carbitol. In some embodiments, the organic solvent may include about 1 to 15 wt. % and often about 1 to 10 wt. % alkylene glycol, such as ethylene glycol, with about 1 to 15 wt. % and often about 1 to 10 wt. % of a glycol ether, such as butyl carbitol, together with about 0.1 to 5 wt. % or about 0.1 to 2 wt. % glycerol.

The aqueous firefighting foam composition includes a thickener, such as a polysaccharide thickener. The polysaccharide thickener may include a polysaccharide that is soluble in the aqueous firefighting foam concentrate and a second polysaccharide that is less soluble or insoluble in the aqueous firefighting foam concentrate. In some embodiments, the second polysaccharide may be insoluble (and dispersed) in the aqueous firefighting concentrate but may be soluble in water alone or in solutions where the concentrate has been diluted with a much larger volume of water. In other embodiments, the concentrate may only include one or more polysaccharides that are completely soluble in the concentrate. The foam concentrate typically includes about 0.1 to 5 wt. %, about 0.2 to 4 wt. %, about 0.3 to 3 wt. %, or about 0.5 to 3 wt. % of the polysaccharide thickener.

Examples of suitable polysaccharide thickeners which may be used in the present foam compositions include agar, sodium alginate, carrageenan, gum arabic, gum guaicum, neem gum, pistacia lentiscus, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, gellan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, and a mixture of two or more thereof.

In some embodiments, the polysaccharide thickener may include one or more of xanthan gum, diutan gum, rhamsan gum, welan, gellan gum, guar gum, konjac gum, tarn gum, and methylcellulose. In some embodiments, a mixture of xanthan gum and one or more of diutan gum, rhamsan gum, welan, gellan gum, guar gum, konjac gum, tarn gum, and methylcellulose may be included in the composition. In other embodiments, the foam concentrate may include a mixture of xanthan gum and one or more of diutan gum, rhamsan gum, welan gum and gellan gum as the polysaccharide thickener. In other embodiments, the foam concentrate may include a mixture of xanthan gum and diutan gum and/or rhamsan gum. In other embodiments, the foam concentrate may include a mixture of xanthan gum and diutan gum. In other embodiments, the foam concentrate may include a mixture of xanthan gum and konjac gum.

Polysaccharide thickeners, which include a combination of xanthan gum and diutan gum, may be particularly suitable for use in the present foam compositions. For examples, the foam composition may include about 0.2 to 3 wt. %, about 0.3 to 2 wt. %, about 0.5 to 1.5 wt. % and even, about 0.5 to 1 wt. % xanthan gum. Such foam compositions may also include about 0.1 to 2 wt. %, about 0.2 to 1.5 wt. %, or even, about 0.2 to 1 wt. % diutan gum.

In many instances, the present aqueous firefighting foam composition may include an alkanolamine, which can act as a pH adjusting agent and/or buffer. Suitable alkanolamines comprise monoethanolamine, diethanolamine, diisopropanolamine and/or triethanolamine. The present compositions may include triethanolamine. The triethanolamine may be present in only a relatively small amount, e.g., about 0.1 to 0.3 wt. % when included primarily as a pH adjusting agent. In other instances, the alkanolamine may be present in a higher amount, whether introduced per se as an ingredient and/or in the form of a cation as part of one of the surfactants present in the composition. In such instances, an alkanolamine such as triethanolamine, may suitably be present as about 0.1 to 5 wt. %, about 0.3 to 5 wt. %, about 0.5 to 3 wt. % and in some instances, about 0.5 to 2 wt. % of the composition.

As discussed above, the aqueous firefighting foam composition includes water. In some embodiments, the water is water from a municipal water source (e.g., tap water). In some embodiments, the water is a purified water, such as purified water that meets the standards set forth in the United States Pharmacopeia, which is incorporated by reference herein in relevant part. In some embodiments, the aqueous firefighting foam composition includes at least about 30 wt. % water, often at least about 40 wt. % water, or at least about 50 wt. % water. In some embodiments, the aqueous firefighting foam composition includes greater than about 60 wt. % water. In some embodiments, the aqueous firefighting foam composition may be produced using a source of water that has a total concentration of fluorine atoms on a weight percentage basis of no more than about 70 ppt F.

The aqueous firefighting foam compositions of the present disclosure are may be substantially free of any fluorinated compounds. As used herein, the "phrase substantially free of fluorinated compounds" means that the aqueous firefighting foam composition includes no more than 0.01 wt. % of fluorinated compounds. In some embodiments, the aqueous firefighting foam composition includes no more than 0.005 wt. % of fluorinated compounds. The aqueous firefighting foam compositions of the present disclosure are substantially free of fluorine. As used herein, the phrase "substantially free of fluorine" means that the composition has a total concentration of fluorine atoms on a weight percentage basis of no more than about 70 parts per trillion (ppt) F. The aqueous firefighting foam compositions of the present disclosure may include substantially less than 70 ppt F.

In some embodiments, the aqueous firefighting foam composition includes one or more chelators or sequestering buffers. Exemplary and non-limiting chelators and sequestering buffers include agents that sequester and chelate metal ions, including polyamminopolycarboxylic acids, ethylenediaminetetraacetic acid, citric acid, tartaric acid, nitrilotriacetic acid, hydroxyethylethylenediaminetriacetic acid and salts thereof. Exemplary buffers include Sorensen's phosphate or Mellvaine's citrate buffers.

In some embodiments, the aqueous firefighting foam composition includes one or more corrosion inhibitors. Exemplary and non-limiting corrosion inhibitors includes ortho-phenylphenol, tolyltriazole, and phosphate ester acids. In some embodiments, the corrosion inhibitor is tolyltriazole.

In some embodiments, the aqueous firefighting foam concentrate may also include a metallic salt, typically a metallic salt which includes a multi-valent cation. For example, suitable salts may include a cation selected from the group consisting of aluminum, calcium, copper, iron, magnesium, potassium, and calcium cations. The counteranion may suitably be a sulfate and/or phosphate anion. In one embodiment, the metallic salt may include a divalent salt, e.g., a magnesium salt such as magnesium sulfate. When included, a divalent salt, such as magnesium sulfate, may suitably be present as about 0.1 to 5 wt. %, about 0.3 to 5 wt. %, about 0.5 to 4 wt. % and in some instances, about 1 to 3 wt. % of the composition.

In some embodiments, the aqueous firefighting foam concentration may include a reducing agent. Accordingly, an aqueous fire-fighting foam concentrate may include a sugar component, an anionic surfactant, a zwitterionic surfactant, an organic solvent comprising glycol ether and/or glycol solvent, a polysaccharide thickener; and a reducing agent. When present, the reducing agent may be present in the foam concentration from about 0.01 wt % to about 5 wt %. This may include from about 0.01 wt % to about 3 wt %, from about 0.05 wt % to about 5 wt %, from about 1 wt % to about 5 wt %, or from about 1 wt % to about 3 wt %.

The reducing agent may be selected such that it is more readily oxidized compared to other components of the foam. For example, the reducing agent may be oxidized more readily than the sugar component or polysaccharide components. Illustrative reducing agents include, but are not limited to, sodium sulfite, sodium bisulfite, sodium metabisulfite, or a mixture of any two or more thereof.

In some embodiments, the aqueous firefighting foam concentration may include a microfibrous cellulose. The microfibrous cellulose may be prepared by microbial fermentation or by mechanically disrupting/altering cereal, wood, or cotton-based cellulose fibers. When microfibrous cellulose prepared by microbial fermentation ("fermentation derived cellulose" or "FDC"), e.g., microfibrous cellulose prepared by bacterial fermentation ("bacterially-derived microfibrous cellulose") is utilized, the elimination of cellular debris may allow the production of transparent solutions at typical use levels. Microfibrous cellulose may function in viscous aqueous systems because it is dispersed rather than solubilized, thereby providing suspension properties in formulations that might otherwise display hazing and/or precipitation often seen using alternative solubilized polymer suspension agents.

A number of commercially available blends of microfibrous cellulose (MFC) with co-agents, which are suitable for use in the present concentrates, have been reported. For example, there have been reports of such materials that may contain either a mixture of microfibrous cellulose, xanthan gum, and carboxymethyl cellulose (CMC) in a ratio of 6:3:1, or a mixture of microfibrous cellulose, guar gum, and CMC in a ratio of 3:1:1. These blends allow the microfibrous cellulose to be prepared as a dry product that can be "activated" with high shear mixing into water or other water-based solutions. "Activation" occurs when these microfibrous cellulose blends are added to water and the polysaccharide co-agents become hydrated. After the hydration of the co-agents, high shear is generally needed to effectively disperse the microfibrous cellulose fibers to produce a three-dimensional functional network.

Illustrative microfibrous cellulose that may be suitable for use in the present concentrates include those sold under the tradename CELLULON™ Fermentation-Derived Cellulose (FDC). CELLULON™ FDC is marketed as an eco-friendly alternative derived from a microbial fermentation process. This may be sold in a liquid form (CELLULON™ Cellulose Liquid, available from CP Kelco). This pre-activated FDC solution offers functionality in high surfactant systems where other hydrocolloids may degrade over time. Alternatively, CELLULON™ FDC is available in a dry powder form, which requires activation via hydration with water and high shear mixing of the aqueous blend. One of products sold under the CELLULON™ cellulose tradename is a mixture containing fermentation-derived cellulose together with maltodextrin and sodium carboxymethyl cellulose (NaCMC) co-agents. In some instances, such a blend may include about 5 to 50 wt. % or, more commonly, about 10 to 30 wt. % fermentation-derived cellulose together with a suitable co-agent(s).

As used herein, the term "fermentation-derived cellulose" (FDC) refers to any microfibrous cellulose produced by a microbial fermentation process (as opposed to materials produced by mechanically disrupting/altering cellulose fibers). CELLULON™ Fermentation-Derived Cellulose products are examples of suitable FDC material that may be used in the present firefighting foam concentrates.

The cellulose fibers of an activated FDC material commonly have a very fine diameter and, once activated, exist as a three-dimensional, highly reticulated net-like structure that gives a very high surface area-to-weight ratio. This three-dimensional, net-like structure can allow the FDC to create a true yield value at low concentrations in a formulation, even those with little or no water, and so provide a mechanism for reliable structuring of liquids and stabilization of components with minimal or no impact on a finished product's viscosity and dispersability.

The microfibrous cellulose included in the present compositions may suitably include microfibrous cellulose produced by mechanically disrupting/altering cellulose fibers, e.g., cereal, wood, and/or cotton-based cellulose fibers—commonly referred to as microfibrillated cellulose (MFC). Microfibrillated cellulose can be obtained through a fibrillation process of cellulose fibers. In such a process, the mechanical shearing can strip away the outer layer of the cellulose fibers, exposing the fibril bundles. The macroscopic fibers are typically mechanically sheared until the fibrils are released, resulting in separation of the cellulose fibers into a three dimensional network of microfibrils with a very large surface area. The exposed fibrils are much smaller in diameter compared to the original fibers, and can form a network or a web-like structure.

One suitable example of microfibrillated cellulose is Exilva™ microfibrillated cellulose (available from Borregaard, Sarpsborg, Norway). Exilva™ microfibrillated cellulose is a pre-activated product, available as a 2% suspension or a 10% paste, that is produced from mechanically disrupting cellulose sourced from Norway spruce. Exilva™ microfibrillated cellulose is reported to be an insoluble microfibrillated cellulose consisting of an entanglement of the cellulose fibers, which has the ability to interact both physically through its extreme surface area and chemically through hydrogen bonding. Other commercial sources of microfibrous cellulose include Celova® microfibrillated cellulose (available from Weidmann Electrical Technology AG (Rapperswil, Switzerland) and Curran® microfibrillated cellulose (available from CelluComp, Fife, Scotland). Curran® microfibrillated cellulose is produced from extraction of nanocellulose fibers from waste streams of root vegetables, primarily carrots and sugar beet pulp.

Another suitable example of a source of microfibrillated cellulose for use in the present compositions is microfibrillated cellulose-mineral composite commercially available from FiberLean® Technologies (Par Moor Centre, United Kingdom). The FiberLean® MFC-composite is reportedly produced by fibrillating the cellulose fibers in the presence of one of a number of different minerals, such as calcium carbonate, clay (e.g., kaolin or bentonite), alumina, zirconia, graphite, silicate or talc, to obtain a nano-fibrillar cellulose suspension.

In many embodiments, the present concentrates may include about 0.1 to 5 wt. %, about 0.5 to 5 wt. % about 1 to 4 wt. % or, in some instances, about 0.5 to 3 wt. % of a suspension agent, which includes microfibrous cellulose. The microfibrous cellulose may include a fermentation-derived cellulose, such as a microfibrous cellulose derived from a microbial fermentation process. In some embodiments, the microfibrous cellulose includes cellulose derived from a bacterial fermentation process, e.g., from fermentation of a *Komagataeibacter xylinus* strain or a *Acetobacter xylinum* strain. Fermentation-derived cellulose (FDC) produced by such a method may have an average fiber diameter of about 0.1-0.2 μm. This very small fiber size and diameter means that a given weight of FDC can have up to 200 times more surface area than other common forms of cellulose.

In many embodiments of the present concentrates, a suspension agent includes microfibrous cellulose together with one or more co-agents. The co-agent(s) may suitable include a water-soluble oligosaccharide and/or water-soluble polysaccharide. The suspension agent may suitable include about 5 to 75 wt. % and, in some instances, about 5 to 50 wt. % or about 10 to 30 wt. % of the microfibrous cellulose. The suspension agent may typically include about 25 to 95 wt. % and, in some instances, about 50 to 90 wt. % or about 70 to 90 wt. % of a co-agent. The co-agent may include a water-soluble oligosaccharide, such as maltodextrin. In other instances, the suspension agent may include a water-soluble polysaccharide co-agent, such as one or more of carboxymethyl cellulose (CMC), a carboxymethyl cellulose salt, xanthan gum and guar gum. In one suitable embodiment, the suspension agent includes fermentation-derived cellulose together with a co-agent including sodium carboxymethyl cellulose and maltodextrin.

The microfibrous cellulose employed in the present concentrates may suitably have an average fiber diameter of no more than about 10 μm, commonly no more than about 1 μm and in some instances about 50 to 300 nm (0.05-0.3 μm). The microfibrous cellulose may be derived from microbial fermentation. Prior to inclusion in the present concentrates, such microbial fermentation derived cellulose is commonly activated by combining a powdered microfibrous cellulose and any optional co-agent with water and then mixing with high shear.

In some embodiments, the present concentrates may include about 0.1 to 5 wt. %, about 0.2 to 5 wt. % about 0.5 to 4 wt. %, or, in some instances, about 0.5 to 3 wt. % microfibrous cellulose. As described herein, the microfibrous cellulose may include fermentation derived cellulose (FDC), microfibrillated cellulose, or a combination thereof. In many instances, the microfibrous cellulose may be formulated together with a co-agent, such as a water-soluble oligosaccharide and/or water-soluble polysaccharide.

In some embodiments, the aqueous firefighting foam concentrate may also include a preservative, such as one or more antimicrobial compounds and/or biocidal compounds. These components are included to prevent the biological decomposition of natural product based polymers that are incorporated as polymeric film formers (e.g., a polysaccharide gum). Examples include Kathon CG/ICP (Rohm & Haas Company), Givgard G-4 40 (Givaudan, Inc.), Dowicil 75 and Dowacide A (Dow Chemical Company). In some instances, the biocidal agent in the present composition may include a phenol-based biocide, such as Dowacide A (sodium o-phenylphenate).

Tables A to F below provide an illustration of suitable formulations of the present firefighting foam compositions designed to be combined with a diluent, then aerated and administered to fight a fire in the form of a firefighting foam.

TABLE A

| Ingredient | Amount (wt. %) |
|---|---|
| Biocide | 0-0.2 |
| Corrosion Inhibitor | 0-0.2 |
| Water | 30-85 |
| Zwitterionic Surfactant | 1-15 |
| Anionic Surfactant | 2-20 |
| Polysaccharide Gum | 0.1-5 |
| Water-miscible organic solvent | 1-20 |
| Monosaccharide sugar(s) and/or sugar alcohol(s) | 5-30 |
| Alkanolamine | 0-5 |

TABLE B

| Ingredient | Amount (wt. %) |
|---|---|
| Biocide | 0-0.2 |
| Corrosion Inhibitor | 0-0.2 |
| Water | 40-75 |
| Hydroxysultaine Zwitterionic Surfactant | 1-10 |
| Alkyl Sulfate Anionic Surfactant | 5-15 |
| Polysaccharide Gum | 0.2-3 |
| Glycol Ether Solvent | 2-15 |
| Polyol Solvent | 2-10 |
| Monosaccharide sugar(s) and/or sugar alcohol(s) | 5-25 |
| Alkanolamine | 0.1-5 |

TABLE C

| Ingredient | Amount (wt. %) |
|---|---|
| Biocide | 0-0.2 |
| Corrosion inhibitor | 0-0.2 |
| Water | 50-75 |
| $C_{8-14}$-alkyl amidopropyl hydroxysultaine | 1-10 |
| $C_{8-14}$-Alkyl sulfate surfactant | 5-10 |
| xanthan & diutan gum | 0.5-3 |
| Alkylene glycol | 1-5 |
| Glycol ether | 2-10 |
| Glycerine | 0-2 |
| Alkanolamine | 0.5-5 |
| Monosaccharide sugar(s) | 10-20 |

TABLE D

| Ingredient | Amount (wt. %) |
|---|---|
| Biocide | 0-0.2 |
| Corrosion Inhibitor | 0-0.2 |
| Water | 55-70 |
| Cocamidopropyl hydroxysultaine | 2-7 |
| Octyl/Decyl/Lauryl Sulfate | 5-10 |
| Diutan Gum | 0.1-2 |
| Xanthan Gum | 0.2-2 |
| Glycerine | 0-2 |
| Ethylene Glycol | 1-5 |
| Butyl Carbitol | 2-7 |
| Triethanolamine | 0.5-3 |
| Glucose and/or fructose | 5-20 |

TABLE E

| Ingredient | Amount (wt. %) |
|---|---|
| Biocide | 0-0.2 |
| Corrosion Inhibitor | 0-0.2 |
| Water | 30-85 |
| Zwitterionic Surfactant | 1-15 |
| Anionic Surfactant | 2-20 |
| Polysaccharide Gum | 0.1-5 |
| Water-miscible organic solvent | 1-20 |
| Monosaccharide sugar(s) and/or sugar alcohol(s) | 5-30 |
| Alkanolamine | 0-5 |
| Reducing agent | 0.1-5 |

TABLE F

| Ingredient | Amount (wt. %) |
|---|---|
| Biocide | 0-0.2 |
| Corrosion Inhibitor | 0-0.2 |
| Water | 30-85 |
| Zwitterionic Surfactant | 1-15 |
| Anionic Surfactant | 2-20 |
| Polysaccharide Gum | 0.1-5 |
| Water-miscible organic solvent | 1-20 |
| Monosaccharide sugar(s) and/or sugar alcohol(s) | 5-30 |
| Alkanolamine | 0-5 |
| Microfibrous cellulose | 0.1-5 |

EXAMPLES

The following examples more specifically illustrate formulations for preparing aqueous firefighting compositions according to various embodiments described above. These examples should in no way be construed as limiting the scope of the present technology.

Tables 1, 2, and 3 below show the composition of a number of exemplary formulations of the present aqueous firefighting foam composition. The amounts shown in these tables represent the weight percentage of the particular component based on the total weight of the composition. The formulations include a) a surfactant mixture including an anionic surfactant and a zwitterionic surfactant, b) organic solvent comprising one or more of an alkylene glycol, glycerol, and a glycol ether, d) a substantial amount of water; e) a polysaccharide thickener. These exemplary formulations typically also include a divalent metal, such as a magnesium salt (e.g., magnesium sulfate). These exemplary formulations may also include a preservative, an antimicrobial and/or a corrosion inhibitor, though these ingredients are considered optional and are not key to the composition functioning as a fire-fighting agent.

TABLE 1

| Component | Ex. 1 | Ex. 2 | Ex. 3 | Ex. 4 | Ex. 5 | Ex. 6 | Ex. 7 | Ex. 8 |
|---|---|---|---|---|---|---|---|---|
| Cocamidopropyl Hydroxysultaine | 4.0 | 4.0 | 4.0 | 4.0 | 4.0 | 4.0 | 4.0 | 4.0 |
| Na Octyl Sulfate | 3.2 | 3.2 | 3.2 | 3.2 | 3.2 | 3.2 | 3.2 | 3.2 |
| TEA Lauryl Sulfate | 3.2 | 3.2 | 3.2 | 3.2 | 3.2 | 3.2 | 3.2 | 3.2 |
| Decyl Sulfate | 1.6 | 1.6 | — | — | — | — | — | 1.2-3.2 |
| TEA* | ~1.1 | ~1.1 | ~1.2 | ~1.2 | ~1.2 | ~1.2 | ~1.2 | ~1.1-1.3 |
| Ethylene glycol monophenyl ether | — | — | — | — | — | 4.0 | 2.0 | — |
| Glycol Ether DPnB | — | — | — | 5.0 | 2.0 | — | 2.0 | — |
| Butyl Carbitol | 5.0 | 5.0 | — | — | 1.0 | — | — | 5-7 |
| 1,6-Hexanediol | — | — | 5.0 | 1.0 | 1.0 | 1.0 | 1.0 | — |
| Ethylene glycol | 2.0 | 5.0 | — | — | 1.0 | — | — | 2-5 |
| Glycerine | ~0.4 | ~0.4 | ~0.4 | ~0.4 | ~0.4 | ~0.4 | ~0.4 | ~0.4 |
| Glucose/fructose | ~13.5 | ~13.5 | ~13.5 | ~13.5 | ~13.5 | ~13.5 | ~13.5 | ~13.5-17 |
| Xanthan/Diutan | 1.5 | 1.5 | 1.5 | 1.5 | 1.5 | 1.5 | 1.5 | 1.5 |
| Mg Sulfate | 2.0 | 2.0 | 2.0 | 2.0 | 2.0 | 2.0 | 2.0 | 2-2.5 |
| Preservative | 0.1 | 0.1 | 0.1 | 0.1 | 0.1 | 0.1 | 0.1 | 0.1 |
| Tolyltriazole | 0.05 | 0.05 | 0.05 | 0.05 | 0.05 | 0.05 | 0.05 | 0.05 |
| Water | ~64 | ~61 | ~66 | ~65 | ~66 | ~66 | ~66 | ~59-61 |

TABLE 2

| Component | Ex. 9 | Ex. 10 | Ex. 11 | Ex. 12 | Ex. 13 |
|---|---|---|---|---|---|
| Cocamidopropyl Hydroxysultaine | 4.0 | 4.0 | 4.0 | 4.0 | 4.0 |
| Na Octyl Sulfate | 3.2 | 3.2 | 3.2 | 3.2 | 3.2 |
| TEA Lauryl Sulfate | 3.2 | 3.2 | 3.2 | 3.2 | 3.2 |
| Decyl Sulfate | 1.6 | 1.6 | 1.2 | 1.6 | 1.2-1.6 |
| TEA | ~1.3 | ~1.3 | ~1.1 | ~1.3 | ~1.1-1.3 |
| Butyl Carbitol | 5 | 7 | 5 | 5 | 5 |
| Ethylene glycol | 5 | 3 | 2 | 2 | 2 |
| Glycerine | ~0.4 | ~0.4 | ~0.4 | ~0.4 | ~0.4 |
| Glucose/fructose | ~13.5 | ~13.5 | ~17 | ~17 | ~17 |
| Xanthan/Diutan | 1.5 | 1.5 | 1.5 | 1.5 | 1.5 |
| Mg Sulfate | 2.0 | 2.0 | 2.5 | 2.5 | 2.5 |
| Preservative | 0.1 | 0.1 | 0.1 | 0.1 | 0.1 |
| Tolyltriazole | 0.05 | 0.05 | 0.05 | 0.05 | 0.05 |
| Water | ~61 | ~61 | ~61 | ~59 | ~59-61 |

TABLE 3

| Component | Ex. 14 | Ex. 15 | Ex. 16 | Ex. 17 | Ex. 18 |
|---|---|---|---|---|---|
| Cocamidopropyl Hydroxysultaine | 4.0 | 4.0 | 4.0 | 4.0 | 4.0 |
| Na Octyl Sulfate | 3.2 | 3.2 | 3.2 | 3.2 | 3.2 |
| TEA Lauryl Sulfate | 3.2 | 3.2 | 3.2 | 3.2 | 3.2 |
| TEA* | ~1.2 | ~1.2 | ~1.2 | ~1.2 | ~1.2 |
| Ethylene glycol monophenyl ether | 2.5 | 4.0 | 3.5 | 3.0 | 3.0 |
| Glycol Ether DPnB | 1.5 | — | 0.5 | 1.0 | 1.0 |
| 1,6-Hexanediol | 0.5 | 0.5 | 0.85 | 0.75 | — |
| 1,12-Dodecanediol | 0.5 | 0.5 | 0.15 | 0.25 | 1.0 |
| Glycerine | ~0.4 | ~0.4 | ~0.4 | ~0.4 | ~0.4 |
| Glucose/fructose | ~13.5 | ~13.5 | ~13.5 | ~13.5 | ~13.5 |
| Xanthan/Diutan | 1.5 | 1.5 | 1.5 | 1.5 | 1.5 |
| Mg Sulfate | 2.0 | 2.0 | 2.0 | 2.0 | 2.0 |
| Preservative | 0.1 | 0.1 | 0.1 | 0.1 | 0.1 |
| Tolyltriazole | 0.05 | 0.05 | 0.05 | 0.05 | 0.05 |
| Water | ~66 | ~66 | ~66 | ~66 | ~66 |

The present exemplary aqueous firefighting foam compositions, including the aqueous firefighting foam formulations shown in Tables A-F and 1-3, typically have a pH of about 7 to 9. The formulations shown in Tables A-F and 1-3 may have a pH of about 7.5 to 8.5. If necessary, a pH-adjusting agent may be added to the composition to achieve the desired pH range.

The present exemplary aqueous firefighting foam compositions, including the exemplary aqueous firefighting foam formulations shown in Tables A-F and 1-3, may have a viscosity of about 1,000 to 10,000 cps, in some instances about 1,000 to 5,000 cps and, in some embodiments, may have a viscosity of about 1,000 to 2,500 cps (as determined at room temperature (75° F./24° C.) with a #4 spindle at 30 rpm).

Method of Producing a Firefighting Foam

The firefighting foam concentrates described herein may be mixed with a diluent to form firefighting foam precursor solution, i.e., a use strength composition. The firefighting foam precursor solution may be aerated (e.g., using a nozzle) to produce a firefighting foam including the firefighting foam concentrate and the diluent. Exemplary diluents may include water, such as fresh water, brackish water, sea water, and combinations thereof. In some embodiments, the firefighting foam compositions described above may be 1 vol. %, 3 vol. %, or 5 vol. % concentrate solutions, meaning that the firefighting foam compositions are mixed with 99 vol. %, 97 vol. %, or 95 vol. % diluent, respectively, to form the firefighting foam precursor solution.

In some instances, it has been found that the order of addition of ingredients with appropriate agitation may impact the actual firefighting performance as seen in the UL and EN fire tests. It may be suitable to begin by mixing the sugar component with a substantial amount of water and subsequently preparing a solution or slurry of the polysaccharide thickener in the aqueous sugar solution prior to blending in the remaining components of the foam concentrate. It was found that first preparing an aqueous sugar solution by combining and mixing the sugars (e.g., glucose, fructose, and/or sorbitol) with water may facilitate later dissolution and/or dispersal of the biogums/biopolymers (e.g., xanthan gum). This can allow the gums to properly hydrate without encapsulating (clumping) upon the addition of the surfactant(s), other optional compounds and remaining amounts of water. Surfactants and other optional compounds can then be added and the resulting mixture may finally be diluted further with water to decrease the viscosity of the preparation, if desired.

Firefighting foams that were prepared not following this order of component addition may result in polysaccharide bio gums that are encapsulated, but not fully hydrated, which can result in the production of foams that are not satisfactory for fire testing. Thus, in some embodiments, the initial formation of an aqueous sugar solution is important in process order and can be used to dissolve/disperse polysaccharide thickener(s) into the foam concentrate before addition of any other ingredients, such as surfactant(s) and/or other compounds.

Method of Fighting a Fire

The firefighting foam compositions described herein may be used to fight a fire and/or to suppress flammable vapors by mixing the firefighting foam compositions with a diluent, aerating the resulting firefighting foam precursor solution to form a firefighting foam, and administering the firefighting foam to a fire or applying the firefighting foam to the surface of a volatile flammable liquid (e.g., gasoline or other flammable hydrocarbon or a flammable polar solvent).

Illustrative Embodiments

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and compositions described herein.

In an exemplary embodiment, the aqueous firefighting foam composition includes a sugar component, which comprises monosaccharide sugar and/or sugar alcohol; anionic surfactant; zwitterionic surfactant; organic solvent comprising glycol ether and/or glycol solvent; and polysaccharide thickener. The composition typically includes at least about 40 wt. % water. The surfactant component does not contain any amine oxide or nonionic surfactant. In many instances, the composition comprises at least about 10 wt. %, or about 10-25 wt. % of the sugar component. Quite often, the sugar component includes at least about 75 wt. % and, often, at least about 85 wt. % monosaccharide sugar and/or sugar alcohol. For example, the sugar component may include at least about 75 wt. % of one or more of glucose, fructose, mannose, xylose, xylitol, sorbitol and mannitol. Typically, the composition is substantially free of fluorinated compounds.

In another exemplary embodiment, the aqueous firefighting foam composition includes about 10 to 25 wt. % of a sugar component, which comprises at least about 75 wt. % monosaccharide sugar and/or sugar alcohol; about 5 to 15 wt. % anionic surfactant; about 2 to 5 wt. % zwitterionic surfactant; about 0.1 to 5 wt. % polysaccharide thickener; about 1 to 20 wt. % organic solvent; and at least about 40 wt. % water. The surfactant component does not contain any amine oxide or nonionic surfactant. The anionic surfactant may include one or more of an aliphatic sulfate salt, aliphatic sulfonate salt, an aliphatic ether sulfate salt, and aliphatic ether sulfate salt. The zwitterionic surfactant may include one or more of an alkylamidoalkyl betaine, an alkyl sulfobetaine, an alkylamidoalkyl hydroxysultaine and an alkyl hydroxysultaine. The organic solvent may include one or more of a glycol, glycol ether, glycerol, and water-soluble polyethylene glycol (PEG). The composition is typically substantially free of fluorinated compounds. The composition generally contains no more than 0.01 wt. % of a fluorinated compound.

In another exemplary embodiment, the aqueous firefighting foam composition includes about 10 to 25 wt. % of monosaccharide sugars and/or sugar alcohols; about 5 to 10 wt. % anionic surfactant, which comprises one or more of an aliphatic sulfate salt, aliphatic sulfonate salt, an aliphatic ether sulfate salt, and aliphatic ether sulfate salt; about 1 to 10 wt. % zwitterionic surfactant, which comprises one or more of an alkylamidoalkyl betaine, an alkyl sulfobetaine, an alkylamidoalkyl hydroxysultaine and an alkyl hydroxysultaine; about 0.1 to 5 wt. % polysaccharide thickener; about 3 to 15 wt. % organic solvent, which comprises one or more of a glycol, glycol ether, glycerol and/or water-soluble polyethylene glycol (PEG); and at least about 40 wt. % water. The composition is typically substantially free of fluorinated compounds. The surfactant component does not contain any amine oxide or nonionic surfactant.

In another exemplary embodiment, the aqueous firefighting foam composition includes about 10 to 25 wt. % of a mixture of glucose and fructose; about 5 to 10 wt. % of a $C_8$-$C_{14}$ alkyl sulfate anionic surfactant; about 1 to 10 wt. % of a $C_8$-$C_{14}$ alkylamidopropyl hydroxysultaine surfactant; about 3 to 15 wt. % of a mixture of ethylene glycol and butyl carbitol; about 0.5 to 3 wt. % diutan gum and xanthan gum; and at least about 40 wt. % water. The surfactant component does not contain any amine oxide or nonionic surfactant. Such a composition my contain no more than 0.01 wt. % fluorinated surfactants and is substantially free of nonionic surfactants.

In another exemplary embodiment, the aqueous firefighting foam composition includes at least about 10 wt. % of a sugar component, which comprises at least about 85 wt. % of one or more monosaccharide sugar and/or sugar alcohol; an anionic surfactant; a zwitterionic surfactant; an organic solvent comprising glycol ether having at least 8 carbon atoms and/or an alkylene glycol having at least 5 carbon atoms; a polysaccharide thickener; and at least about 50 wt. % water. The surfactant component does not contain any amine oxide or nonionic surfactant. Such a composition may contain no more than 0.01 wt. % fluorinated surfactants and is substantially free of nonionic surfactants. In such compositions, the organic solvent may include one or more of 1,6-hexanediol, hexylene glycol, 1,12-dodecanediol, ethyleneglycol monophenyl ether, butyl carbitol and dipropylene glycol monobutyl ether. In some instances, a composition may be provided where the organic solvent does not contain any butyl carbitol.

In another exemplary embodiment, the aqueous firefighting foam composition includes about 5 to 20 wt. % of a sugar component which comprises one or more monosaccharide sugars and/or sugar alcohols; about 5 to 15 wt. % of a surfactant system comprising an anionic surfactant and a zwitterionic surfactant; about 0.2 to 1.5 wt. % a polysaccharide thickener; about 1 to 5 wt. % of an organic solvent system comprising at least one organic solvent selected from a glycol ether, a glycol, a glycerol, and mixtures thereof; and at least about 50 wt. % water. Such compositions may contain no more than 0.01 wt. % fluorinated surfactants and are substantially free of nonionic surfactants. In some embodiments, the surfactant system may include cocamidopropyl hydroxysultaine and at least one of an octyl sulfate, a lauryl sulfate, and a decyl sulfate. In some embodiments, the surfactant system includes from about 3.8 to about 4.2 wt. % cocamidopropyl hydroxysultaine, from about 2.8 to about 3.5 wt. % sodium octyl sulfate, from about 2.8 to about 3.5 wt. % triethanolamine lauryl sulfate, and from about 1.0 to about 2.0 wt. % decyl sulfate. In some embodiments, the organic solvent system includes butyl carbitol, ethylene glycol, glycerine, or mixtures thereof. In some embodiments, the organic solvent system includes about 4 to 6 wt. % butyl carbitol, about 1 to 3 wt. % ethylene glycol, and about 0.1 to 1 wt. % glycerine. Some embodiments include a divalent metal salt, a preservative, or an antimicrobial agent. In some embodiments, the composition includes about 1 to 3 wt. % magnesium sulfate, about 0.05 to 0.2 wt. % preservative, and about 0.01 to 0.1 wt. % tolyltriazole.

In another exemplary embodiment, the aqueous firefighting foam composition includes about 10 to 20 wt. % of a sugar component which comprises one or more monosaccharide sugars and/or sugar alcohols; about 5 to 15 wt. % of a surfactant system comprising an anionic surfactant and a zwitterionic surfactant; about 0.2 to 1.0 wt. % a polysaccharide thickener; about 1 to 5 wt. % of an organic solvent system comprising at least one organic solvent selected from a glycol ether, a glycol, a glycerol, and mixtures thereof; and at least about 50 wt. % water. Such compositions may contain no more than 0.01 wt. % fluorinated surfactants and are substantially free of nonionic surfactants.

In another exemplary embodiment, the aqueous firefighting foam composition includes about 15 to 20 wt. % of a sugar component which comprises at least 85 wt. % of a monosaccharide sugars and/or sugar alcohols; about 5 to 10 wt. % of a $C_8$-$C_{14}$ alkyl sulfate anionic surfactant; about 2 to 7 wt. % cocamidopropyl hydroxysultaine; about 5 to 10 wt. % of an organic solvent system comprising at least one water-soluble organic solvent selected from butyl carbitol, ethylene glycol, glycerine, and mixtures thereof; about 0.5 to 3 wt. % polysaccharide thickener comprising xanthan gum and diutan gum; a divalent salt; and at least about 50 wt. % water. Such compositions may contain no more than 0.01 wt. % fluorinated surfactants and are substantially free of nonionic surfactants.

In the exemplary embodiments above including an organic solvent, it may be beneficial to include one or more of 1,6-hexanediol, hexylene glycol, ethyleneglycol monophenyl ether, butyl carbitol and dipropylene glycol monobutyl ether. Those exemplary embodiments including a polysaccharide thicker may benefit from including one or more of xanthan gum, diutan gum, rhamsan gum, welan, gellan gum, guar gum, konjac gum, tarn gum, and methylcellulose. Those exemplary embodiments including an anionic surfactant may benefit from including one or more of a $C_{8-18}$-alkylamidopropyl hydroxysultaine surfactant, a $C_{8-18}$-alkylamidopropyl betaine surfactant a $C_{8-18}$-alkyl sulfobetaine surfactant and a $C_{8-18}$-alkyl betaine surfactant.

In any exemplary embodiment herein, the aqueous firefighting composition may also include a reducing agent, a microfibrous cellulose, or a suspension agent. In various embodiments, the reducing agent includes a sulfite salt. In various embodiments, the reducing agent includes sodium sulfite, sodium metabisulfite, sodium bisulfite, or a mixture of any two or more thereof. In various embodiments, the microfibrous cellulose includes a fermentation derived cellulose. In various embodiments, the microfibrous cellulose may be derived from a microbial fermentation process. In various embodiments, the microfibrous cellulose may be derived from a bacterial fermentation process. In various embodiments, the microfibrous cellulose has an average fiber diameter of no more than about 10 μm. This may include no more than about 1 μm, or in some embodiments, from about 50 to 300 nm. In various embodiments, prior to incorporation into the composition the microfibrous cellulose may be activated by combining a powdered microfibrous cellulose and optionally co-agent with water and mixing with high shear. In various embodiments, the compositions/concentrates includes about 0.1 to 5 wt. %, or about 0.5 to 3 wt. %, of the suspension agent.

In another exemplary embodiment, a firefighting foam may be created by mixing any of the preceding firefighting foam composition and a diluent. The aqueous diluent may be selected from the group consisting of fresh water, brackish water, sea water, and combinations thereof.

Another exemplary embodiment comprises a method of forming a firefighting foam in which the method includes the steps of mixing the firefighting foam composition of any of the preceding illustrative embodiments with an aqueous diluent to form a foam precursor solution, and aerating the foam precursor solution to form the firefighting foam. In such a method the aqueous diluent may be selected from the group consisting of fresh water, brackish water, sea water, and combinations thereof.

Another exemplary embodiment is a method of fighting a fire, where the method includes the steps of administering the firefighting foam described in the preceding exemplary embodiments to the fire.

In the exemplary embodiments described above, an aqueous firefighting foam composition may be provided that does not contain any protein hydrolysate. In some instances, an aqueous firefighting foam composition may be provided that does not contain any synthetic polymer or copolymer. In some instances, an aqueous firefighting foam composition may be provided that does not contain any non-biopolymeric thickening agent.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A firefighting foam concentrate comprising:

about 10 wt % to 25 wt % of a sugar component comprising a monosaccharide sugar, a sugar alcohol, or a mixture of any two or more thereof;

about 5 to 10 wt. % of an anionic surfactant comprising octyl sulfate salt, decyl sulfate salt, lauryl sulfate salt, or a mixture of any two or more thereof;

about 2 to 7 wt. % of a zwitterionic surfactant comprising cocamidopropyl hydroxysultaine;

about 2 to 10 wt. % of a water-miscible solvent mixture comprising diethylene glycol monobutyl ether;

a magnesium salt;

at least about 50 wt. % water; and a suspension agent comprising:

microfibrillated cellulose; and an oligosaccharide, a polysaccharide, or a mixture of any two or more thereof;

wherein the suspension agent is at least partially insoluble in the firefighting foam concentrate such that at least a portion of the suspension agent is dispersed in the firefighting foam concentrate, and wherein the firefighting foam concentrate is substantially free of fluorinated compounds.

2. The firefighting foam concentrate of claim 1, wherein greater than 50 wt. % of the microfibrillated cellulose is dispersed in the firefighting foam concentrate and not solubilized.

3. The firefighting foam concentrate of claim 1, wherein the suspension agent comprises fermentation-derived microfibrous cellulose, xanthan gum, carboxymethyl cellulose, or a mixture thereof.

4. The firefighting foam concentrate of claim 1, wherein the sugar component comprises at least about 50 wt. % of the monosaccharide sugar, the sugar alcohol, or mixture of any two or more thereof.

5. The firefighting foam concentrate of claim 1, wherein the sugar component comprises glucose, fructose, mannose, xylose, xylitol, sorbitol, mannitol, or a mixture of any two or more thereof.

6. The firefighting foam concentrate of claim 1, wherein the suspension agent comprises microfibrillated cellulose, xanthan gum, and carboxymethyl cellulose in a ratio of about 6:3:1 or microfibrillated cellulose, guar gum, and carboxymethyl cellulose in a ratio of about 3:1:1.

7. The firefighting foam concentrate of claim 1 further comprising a biocide, a corrosion inhibitor, a reducing agent, or a mixture of any two or more thereof.

8. The firefighting foam concentrate of claim 1 further comprising a polysaccharide thickener, the polysaccharide thickener comprising xanthan gum.

9. A firefighting foam concentrate comprising:

about 10 to 25 wt. % of a sugar component comprising a monosaccharide sugar, a sugar alcohol, or a mixture of any two or more thereof;

about 5 to 10 wt. % of an anionic surfactant comprising octyl sulfate salt, decyl sulfate salt, lauryl sulfate salt, or a mixture of any two or more thereof;

about 2 to 7 wt. % of a zwitterionic surfactant comprising cocamidopropyl hydroxysultaine;

a water-miscible solvent mixture comprising diethylene glycol monobutyl ether;

about 0.3 to 10 wt. % of a suspension agent comprising:

microfibrillated cellulose derived from fibrillation of cellulose fibers; and an oligosaccharide, a polysaccharide, or a mixture of any two or more thereof;

wherein the suspension agent is at least partially insoluble in the firefighting foam concentrate such that at least a portion of the suspension agent is dispersed in the firefighting foam concentrate;

a magnesium salt; and at least about 50 wt. % water; and wherein the firefighting foam concentrate is substantially free of fluorinated compounds.

* * * * *